United States Patent
Di Marco et al.

(10) Patent No.: US 7,994,772 B2
(45) Date of Patent: Aug. 9, 2011

(54) REMOTE TRANSMITTER FOR ANALOGUE GAUGES

(75) Inventors: Mirko Di Marco, Kleinwallstadt (DE);
Hermann Julien, Klingenberg (DE);
Arno Klug, Elsenfeld (DE)

(73) Assignee: WIKA Alexander Wiegand GmbH & Co., Klingenberg (DE)

( * ) Notice: Subject to any disclaimer, the term of this patent is extended or adjusted under 35 U.S.C. 154(b) by 353 days.

(21) Appl. No.: 12/298,274

(22) PCT Filed: Jan. 4, 2007

(86) PCT No.: PCT/EP2007/050090
§ 371 (c)(1),
(2), (4) Date: Feb. 9, 2009

(87) PCT Pub. No.: WO2007/122018
PCT Pub. Date: Nov. 1, 2007

(65) Prior Publication Data
US 2009/0212767 A1    Aug. 27, 2009

(30) Foreign Application Priority Data

Apr. 24, 2006 (EP) .................................... 06113002

(51) Int. Cl.
*G01B 7/30* (2006.01)
(52) U.S. Cl. ............. 324/117 H; 324/207.2; 324/207.25
(58) Field of Classification Search ........................ None
See application file for complete search history.

(56) References Cited

U.S. PATENT DOCUMENTS

| | | | |
|---|---|---|---|
| 5,231,508 A | 7/1993 | Murphy | |
| 5,880,586 A | 3/1999 | Dukart et al. | |
| 6,563,306 B2 * | 5/2003 | Sato | 324/207.2 |
| 7,140,257 B2 | 11/2006 | Henson et al. | |
| 7,855,554 B2 * | 12/2010 | Oohira | 324/251 |
| 2002/0144555 A1 | 10/2002 | Schenk | |
| 2004/0093952 A1 | 5/2004 | Eisenbarth | |

FOREIGN PATENT DOCUMENTS

| | | |
|---|---|---|
| CN | 2321006 Y | 5/1999 |
| DE | 2353812 A1 | 12/1974 |
| DE | 3522383 A1 | 1/1987 |
| DE | 19543562 A1 | 5/1996 |
| EP | 0055131 A | 6/1982 |
| GB | 1443241 | 10/1973 |
| WO | 2006043078 A | 4/2006 |

OTHER PUBLICATIONS

Dorsch G et al.: "Incremental and Absolute Shaft Encoders with Hall Generators for Weighing Applications"; Siemens Review, Siemens Verlag, Erlangen, DE, vol. 39, No. 4, Apr. 1972, pp. 173-177, XP008065538; ISSN: 0302-2528 (the whole document) (claim 1).

* cited by examiner

*Primary Examiner* — Ha Tran T Nguyen
*Assistant Examiner* — Trung Q Nguyen
(74) *Attorney, Agent, or Firm* — Baker & Hostetler LLP

(57) ABSTRACT

In a method for converting an analogue measurement indication into electric signals, the angle of rotation of the pointer of an analogue display is contact free detected and converted into a proportional electrical output signal. This is achieved by using an application-specific integrated circuit having a Hall sensor which can detect the magnetic flux density parallel to the surface of the integrated circuit.

15 Claims, 3 Drawing Sheets

REMOTE TRANSMITTER FOR ANALOGUE GAUGES

CROSS-REFERENCE TO RELATED APPLICATIONS

This application is a 371 of PCT/EP2007/050090 filed on Jan. 4, 2007 which claims priority to EP 06113002.7 filed on Apr. 24, 2006, the disclosures of each are incorporated herein by reference.

FIELD OF THE INVENTION

The invention relates to a remote transmitter for analogue gauges, an analogue gauge comprising a rotation angle transmitter as well as a method for converting an analogue measurement indication into electric signals.

STATE OF THE ART

In the field of temperature and pressure measuring technology, the use of analogue gauges is common.

When these analogue gauges are to be included in a process monitoring, it is necessary to provide electric signals which reproduce the analogue indication. This means that the analogue indication of the measured variable has to be converted into electric signals.

For instance, it is common to convert into a standardized analogue output signal (such as a standard signal) in a current range of from 4 to 20 milliamps, in a voltage range of from 0.5 to 3.5 V or in a particular frequency range.

Apart from that, also some of the known transducers offer digital interfaces for a direct connection to digital control systems.

However, in numerous known gauges having a mechanical display and electric output signals, the pick-up is carried out at the sensing element. In this case the assembly as well as the subsequent calibration is very difficult.

Moreover, in the state of the art for converting the analogue indication into an electric signal generally the problem arises that disturbing influences can be exerted on the electric output signal by friction, a mass or the type of coupling.

For the rest, it is evaluated that publication US2002/0144555 discloses a method of upgrading a dial gauge to provide a remote display qualification. More exactly speaking, a dial gauge, a method and a kit for upgrading a dial gauge for providing both a locally visible display and a remote display of a measured physical parameter are disclosed. A magnetic rotational pointer is disclosed for coupling a magnet with a pointer or by providing a substitute pointer including an integrated magnet so that the magnetic rotational pointer is rotatable in reaction to the change of a measured physical parameter. A potentiometer is magnetically coupled to the magnetic rotational pointer and is fixed to a front of the dial gauge.

It is further evaluated that publication DE 195 43 562 A1 suggests an arrangement for a contact free detection of the angle of rotation of a rotatable element in which a magnetic field intensity generated or influenced by the rotatable element can be detected and considered for determining the position of rotation while evaluating properties which can be magnetically influenced in a sensor arrangement. In order to detect also the absolute position of rotation of the rotatable element in a simple manner, the sensor arrangement consists of at least two sensor elements and is arranged opposite to the rotatable element such that the field lines from the rotatable element in each position of rotation extend transversely to the sensor structures predetermined by the direction of a current in the sensor elements.

The directional components of the field lines can be evaluated by different electronic evaluating means to detect the position of rotation (angle of rotation α) by evaluating the phase position between the input and output signals of the respective sensor elements. As input signals either sinusoidal or square-wave AC voltages or DC voltages are supplied.

SUMMARY OF THE INVENTION

Consequently, the object underlying the present invention is to eliminate the afore-mentioned drawbacks from the state of the art.

According to the invention, a method for converting an analogue measurement indication into electric signals is provided in which the angle of rotation of the pointer is contact free detected and converted into a proportional electrical output signal. This is achieved by using, according to the invention, an application-specific integrated circuit having a Hall sensor which can detect the magnetic flux density parallel to the surface of the integrated circuit.

More exactly speaking, the method according to the invention comprises the steps of: positioning an application-specific integrated circuit having a Hall sensor which is adjusted to detect a magnetic flux density parallel to the surface of the integrated circuit, the Hall sensor being disposed in parallel to the plane of rotation and above the rotational axis of a pointer of the analogue rotational display of a gauge, wherein the pointer carries a magnet; measuring the angle of rotation of the magnet by the application-specific integrated circuit having the Hall sensor; and outputting an electric signal in accordance with the angle of rotation of the magnet.

According to the invention, furthermore a remote transmitter for analogue gauges is provided. It comprises an application-specific integrated circuit having a Hall sensor which is adjusted to detect a magnetic flux density parallel to the surface of the integrated circuit; and a pointer having a magnet, wherein the pointer is adjusted for use in an analogue rotational display of a gauge; and wherein the application-specific integrated circuit having the Hall sensor and the pointer having the magnet are adjusted so that the application-specific integrated circuit having the Hall sensor can be arranged in parallel to the plane of rotation and above the rotational axis of the pointer.

The term "transmitter" in the present case denotes a device which (out)puts a converted measured variable. The term "remote transmitter" merely indicates the qualification for outputting the converted measured variable ("to the distance").

In accordance with an advantageous configuration of the invention, the remote transmitter is disposed on a display glass adapted to be installed in or mounted to a gauge. Terminals for power supply and/or for picking up the provided electric signals can be guided through the display glass to the outside for a plug-in connection.

This configuration permits to provide a unit independent of the final assembly which is suited for installation in or mounting to pointer gauges manufactured as a standard.

The gauge can be, for instance, a manometer or a thermometer.

The outputs for the electric signals can be voltage and/or current outputs. It is especially advantageous when standardized bus systems and/or interfaces are included. The bus systems may comprise Lin, LAN, Can or Profibus, while the interfaces may comprise, for instance, USB, RS232 or RS485.

Moreover, according to the invention, an analogue gauge having a rotation angle transmitter is provided, the rotation angle transmitter being designed in accordance with the remote transmitter according to the invention.

The gauge according to the invention can be designed such that the application-specific integrated circuit is arranged inside the gauge and terminals for providing electric signals with respect to a rotation angle display visible from outside are guided out to the rear.

The above-described embodiments of the solution according to the invention have in common that they are independent of the positions of the mechanical and electrical inputs and the measured variables thereof. The solution according to the invention can be applied in an especially advantageous manner in a process monitoring such as, for example, a water pressure display or in a heating system.

BRIEF DESCRIPTION OF THE DRAWING

Hereinafter the invention will be described in detail by way of embodiments with reference to the enclosed drawing, in which.

PREFERRED EMBODIMENTS OF THE INVENTION

The following description of the preferred embodiments of the invention by way of the enclosed drawing is intended to illustrate the invention and is not supposed to convey an understanding of the invention restricted to the embodiments.

Figure 1:
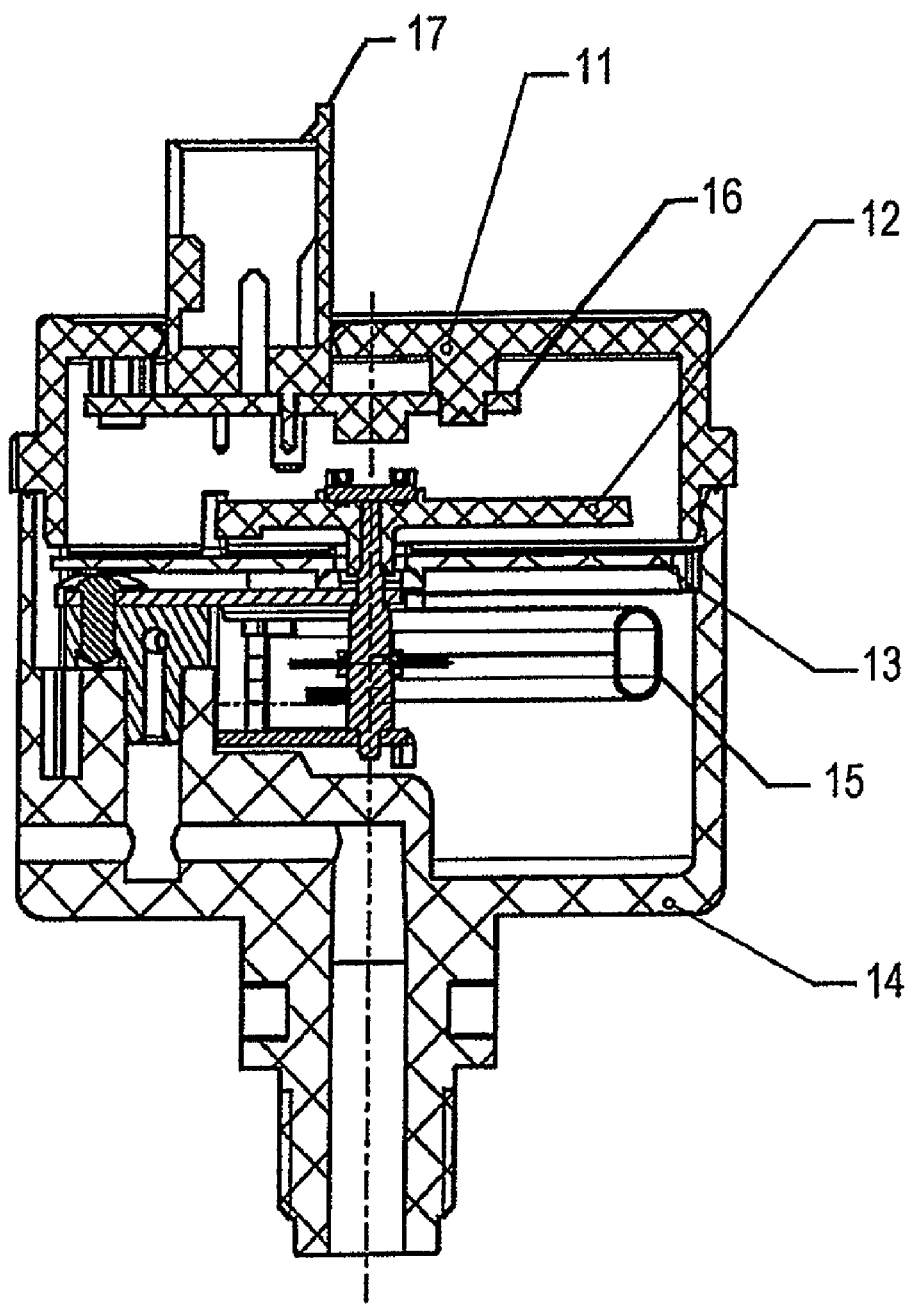
FIG. 1 shows a sectional view of a pressure gauge having a pipe spring and an electrical output signal in accordance with a first embodiment of the invention.

FIG. 1 shows a sectional view of a pressure gauge comprising a Bourdon pipe and an electrical output signal in accordance with a first embodiment of the invention.

Reference number 11 denotes the display glass of the pressure gauge through which a rotation angle display 13 can be read below the pointer denoted with reference number 12 in combination with the latter.

Reference number 14 denotes the housing of the pressure gauge including a Bourdon pipe 15 as part of the (mechanical) pressure sensing system. These elements are shown to illustrate the configuration in accordance with the first embodiment of the invention, but they can also be replaced with elements exercising essentially similar effects in the sense of the invention.

Reference number 16 denotes a conductor plate comprising the application-specific integrated circuit having the Hall sensor adapted for detecting a magnetic flux density parallel to the surface of the integrated circuit as rotation angle transmitter.

As shown in FIG. 1, the rotation angle transmitter is arranged in parallel to the plane of rotation of the pointer 12 and above the rotational axis thereof.

Moreover, the conductor plate 16 is mounted with the rotation angle transmitter at the inside of the display glass 11.

According to the first embodiment, the electric terminals of the conductor plate 16 are guided through the display glass to the outside and are connected to a plug 17.

Figure 2:
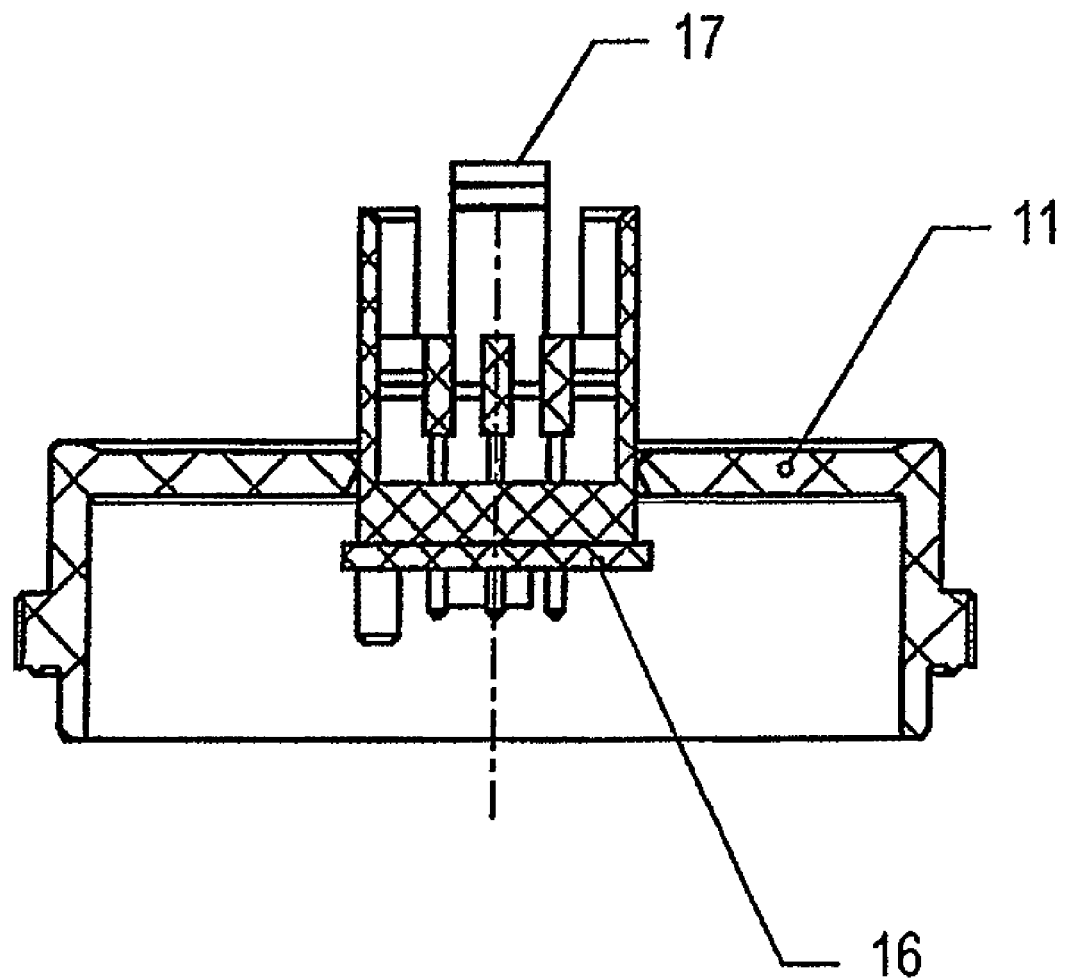
FIG. 2 shows a sectional view of an display glass including the remote transmitter according to the invention for a pressure gauge in accordance with a second embodiment of the invention.

As an especially preferred embodiment of the invention, FIG. 2 shows the unit of the display glass according to FIG. 1, wherein a representation perpendicular to FIG. 1 is chosen. The same components are provided with the same reference numbers and are not described once again.

Said second embodiment of the invention shows a unit independent of final assembly including the remote transmitter according to the invention which is suited for installation in or mounting to pointer gauges manufactured as a standard. Such mounting is exemplified in FIG. 1.

Figure 3A:
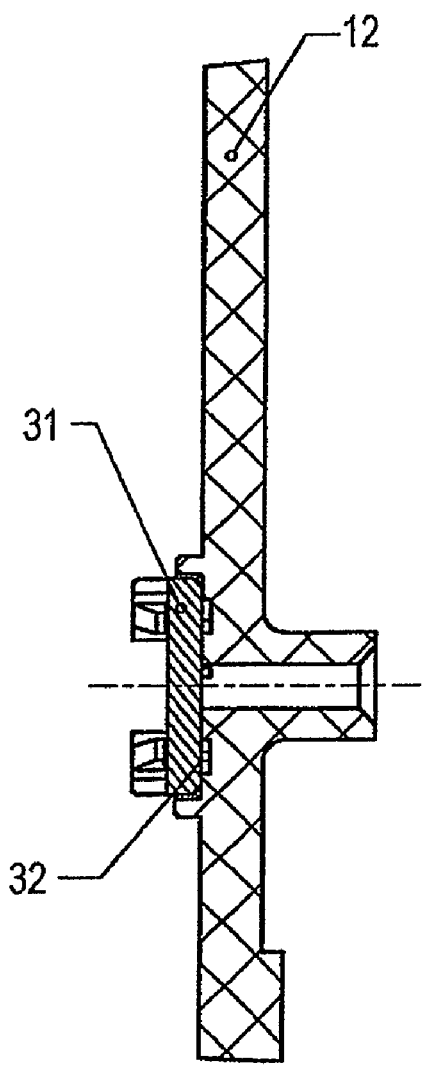
FIGS. 3A and 3B show a sectional view and a top view of a pointer having a permanent magnet for a pressure gauge according to the second embodiment of the invention.
Figure 3B:
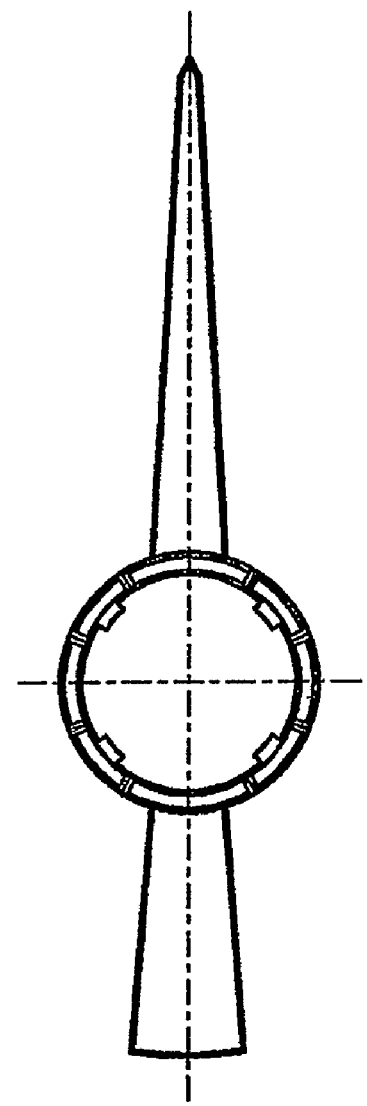

Said unit includes the pointer 12 which is provided, according to the second embodiment, with a permanent magnet 31, as is shown in FIGS. 3A and 3B. The permanent magnet 31 can be fixed to the pointer 12 for instance by an adhesive agent 32.

The dash-dot lines of the FIGS. 2, 3A and 3B indicate that the application-specific integrated circuit having the Hall sensor on the conductor plate 16 and the pointer 12 having the magnet 31 are adjusted such that the application-specific integrated circuit having the Hall sensor can be disposed in parallel to the plane of rotation and above the rotational axis of the pointer 12.

Thus the foregoing description comprises a method for converting an analogue measurement indication into electric signals in which the angle of rotation of the pointer of an analogue display is contact free detected and converted into a proportional electrical output signal. This is achieved by using an application-specific integrated circuit having a Hall sensor which is adapted to detect the magnetic flux density parallel to the surface of the integrated circuit. The method comprises the steps of: positioning an application-specific integrated circuit having a Hall sensor which can detect a magnetic flux density parallel to the surface of the integrated circuit, the Hall sensor being disposed parallel to the plane of rotation and above the rotational axis of a pointer of the analogue rotational display of a gauge, the pointer supporting a magnet; measuring the angle of rotation of the magnet by the application-specific integrated circuit having the Hall sensor; and outputting an electric signal in accordance with the angle of rotation of the magnet.

In this method for converting an analogue measurement indication into electric signals the angle of rotation of the pointer of an analogue display is contact free detected and converted into a proportional electrical output signal. This is achieved by using an application-specific integrated circuit having a Hall sensor which can detect the magnetic flux density parallel to the surface of the integrated circuit.

While in the foregoing preferred embodiments of the invention are described by way of the enclosed drawing, the person skilled in the art is aware of the fact, however, that numerous configurations and modifications of the invention can be made without deviating from the scope of invention defined by the following claims. Those configurations and modifications rather have to be understood to be comprised by the invention.

The invention claimed is:
1. A method for converting an analogue measurement indication into electric signals, comprising the steps of:
  positioning an application-specific integrated circuit having a Hall sensor which is adapted to detect a magnetic flux density parallel to the surface of the integrated circuit, the Hall sensor being disposed parallel to the plane of rotation and above the rotational axis of a pointer of the analogue rotational display of a gauge, the pointer supporting a magnet;

measuring the angle of rotation of the magnet by the application-specific integrated circuit having the Hall sensor; and outputting an electric signal in accordance with the angle of rotation of the magnet.

2. A method according to claim 1, wherein the integrated circuit is arranged on a display glass which is adapted to be installed in or mounted to a gauge.

3. A method according to claim 2, wherein terminals for power supply and/or for picking up the electric signal are guided through the display glass to the outside for a plug-in connection.

4. A method according to claim 3, wherein the outputs for the electric signals are voltage and/or current outputs.

5. A method according to claim 3, wherein the terminals are adapted to a standardized bus system.

6. A method according to claim 3, wherein the terminals are adapted to a standardized interface.

7. A remote transmitter for analogue gauges comprising:

an application-specific integrated circuit having a Hall sensor which is adapted to detect a magnetic flux density parallel to the surface of the integrated circuit; and a pointer having a magnet, wherein the pointer is adapted to be used in an analogue rotational display of a gauge; and wherein the application-specific integrated circuit having the Hall sensor and the pointer having the magnet are adjusted such that the application-specific integrated circuit having the Hall sensor can be disposed parallel to the plane of rotation and above the rotational axis of the pointer.

8. A remote transmitter according to claim 7, wherein the remote transmitter is disposed on a display glass which is adapted to be installed in or mounted to a gauge.

9. A remote transmitter according to claim 8, wherein terminals for power supply and/or for picking up electric signals are guided through the display glass to the outside for a plug-in connection.

10. A remote transmitter according to claim 9, wherein the outputs for the electric signals are in the form of voltage and/or current outputs.

11. A remote transmitter according to claim 10, wherein the terminals are adapted to a standardized bus system.

12. A remote transmitter according to claim 10, wherein the terminals are adapted to a standardized interface.

13. An analogue gauge comprising a rotation angle transmitter, wherein the rotation angle transmitter is a remote transmitter according to claim 7.

14. A gauge according to claim 13, wherein the application-specific integrated circuit is arranged inside the gauge and terminals for providing electric signals are guided out to the rear with respect to a rotation angle display visible from outside.

15. A gauge according to claim 13, wherein the gauge is a manometer or a thermometer.

* * * * *